US005381687A

United States Patent [19]

Nguyen et al.

[11] Patent Number: 5,381,687

[45] Date of Patent: Jan. 17, 1995

[54] ESCALATOR COMBPLATE STOP SWITCH LOAD CALIBRATING ASSEMBLY

[75] Inventors: Dat Nguyen, New Britain; James A. Rivera, Bristol, both of Conn.

[73] Assignee: Otis Elevator Company, Farmington, Conn.

[21] Appl. No.: 963,344

[22] Filed: Oct. 19, 1992

[51] Int. Cl.[6] .............................................. G01L 25/00

[52] U.S. Cl. ...................................................... 73/1 B

[58] Field of Search ............... 73/1 B, 865.9; 198/323, 198/325

[56] References Cited

U.S. PATENT DOCUMENTS 2,030,103 2/1936 Dunlop .
2,862,599 12/1958 Sinden et al. .

FOREIGN PATENT DOCUMENTS 1159589 7/1969 United Kingdom .

*Primary Examiner*—Tom Noland
*Assistant Examiner*—Daniel S. Larkin

[57] ABSTRACT

An escalator combplate is equipped with a stop switch that will interrupt the power to the escalator when objects trapped between the stop treads and combplate impose a predetermined lifting force on the combplate. The nécessary lifting force is determined by code requirements, and the combplate is subjected to an upward spring force which equals the code-dictated lifting force. While the combplate is being lifted by the spring force, the stop switch or switches are set so that they will actuate at the calibrated position of the combplate. The spring force is then removed to allow the combplate to settle back to its normal operating position.

6 Claims, 2 Drawing Sheets

ESCALATOR COMBPLATE STOP SWITCH LOAD CALIBRATING ASSEMBLY

TECHNICAL FIELD

This invention relates to an assembly for calibrating stop switches for an escalator combplate safety system. More particularly, the assembly of this invention can be used to calibrate stop switch systems of the type disclosed in copending U.S. patent application Ser. No. 07/914,823, filed Jul. 15, 1992, now U.S. Pat. No. 5,307,918.

BACKGROUND ART

Escalators and moving walkways are provided with combplate safety assemblies which are operable to shut the escalator down in the event that foreign objects become lodged between the treads and the exit combplate. These assemblies can be actuated by interrupting a light beam which passes beneath the combplate, such as disclosed in U.S. Pat. No. 4,800,998, granted Jan. 31, 1989 to R. E. Myrick; or by upward movement of the comb or the entire combplate, such as disclosed in the aforesaid copending application. Combplate safety systems have also been suggested which operate in response to bending or breaking of one or more of the comb teeth.

Safety systems of the character described will be included in new equipment, and are typically required by code to be incorporated into older equipment which has been in operation in the field for many years. Code changes can require that more sensitive systems be incorporated into existing and operating escalators and moving walkways.

Combplate safety systems that operate as a result of lifting the combplate, especially in older equipment, can be difficult to calibrate due to the fact that the weight of older combplates, and the ease of operation of their pivot mounts will vary widely. An example of this fact is apparent from recent code changes enacted with respect to escalators and moving walkways in the city of New York. The code changes require that the safety systems be actuated when the combplates are subjected to a lifting force of 30 lb. or more. Existing systems must be adapted to meet this new requirement. Given the fact that given combplates, even for common equipment, will not all weigh exactly the same, each will exhibit different resistance to upward movement due to variations in the manner in which they are mounted. These realities make adaptation of existing systems to meet the new code requirements very difficult. The data needed to accurately set or calibrate each system is: how far will the combplate be lifted from its normal or rest position when it is subjected to exactly 30 lbs. (or whatever other standard is established)? This piece of information is very difficult to empirically calculate for each different piece of equipment.

DISCLOSURE OF THE INVENTION

This invention relates to a tool assembly which operable to calibrate combplate stop switches so that they will be actuated exactly at the required lifting force. The tool assembly of this invention can be use to calibrate any upwardly deflecting combplate assembly, regardless of the combplate weight, and regardless of the mounting structure used, about which the combplate pivots. The tool is used at the time that the escalator is modified to meet any code or other safety changes.

The tool includes a bridge portion which is placed over the combplate, and which rests on stationary parts of the escalator flanking the combplate, such as the landing plate and a step tread in the landing area. A vertically extending threaded rod is movably mounted on the bridge and extends through the bridge toward the comb section of the combplate. A mounting plate is fixed to the lower end of the rod, the mounting plate being adapted to be fastened to the combplate. A coil spring is positioned on the bridge to bias the rod upwardly relative to the bridge. The spring constant is used to calculate the length of the compressor spring which will impart a lifting force of X lbs. to the combplate when the mounting plate is secured to the combplate.

The tool is used by a mechanic to calibrate the stop switches as follows. The escalator is stopped, and the bridge is positioned on the top step tread and on the landing plate. One of the comb sections is removed from the combplate, and the mounting plate is fastened to the combplate in its place. The spring on the rod is compressed and the rod is properly positioned on the bridge so that subsequent expansion of the compressor spring will immediately impart a lifting force to the combplate. Empirical calculations based on the spring constant establish a compressed spring length that results in an upwardly directed force of X lbs. being exerted on the combplate. This lifting force will cause an upward deflection of the combplate, the extent of which will vary to some extent for each combplate in question. Once the X lb. force deflection has been achieved, the stop switches are aligned and properly positioned on the truss and connected to a voltmeter to ensure that the switches open (or close) exactly at the established combplate deflection distance. The switches are then fixed in place and the mounting plate is disconnected from the comb. The combplate then settles back to its normal position, and the comb section is replaced. The tool is then removed and the escalator is ready to operate in conformity with code requirements.

It is therefore an object of this invention to provide a tool for calibrating an escalator or moving walkway combplate stop switch safety system to ensure code conformance.

It is a further object of this invention to provide a tool of the character described which is used to properly position a stop switch for actuation upon a known degree of upward movement of the combplate.

It is another object of this invention to provide a tool of the character described wherein the tool establishes the degree of upward deflection of the combplate by exerting a known lifting force on the combplate.

These and other objects and advantages of the invention will become more readily apparent from the following detailed description of a preferred embodiment thereof when taken in conjunction with the accompanying drawings, in which:

BEST MODE FOR CARRYING OUT THE INVENTION

Figure 1:
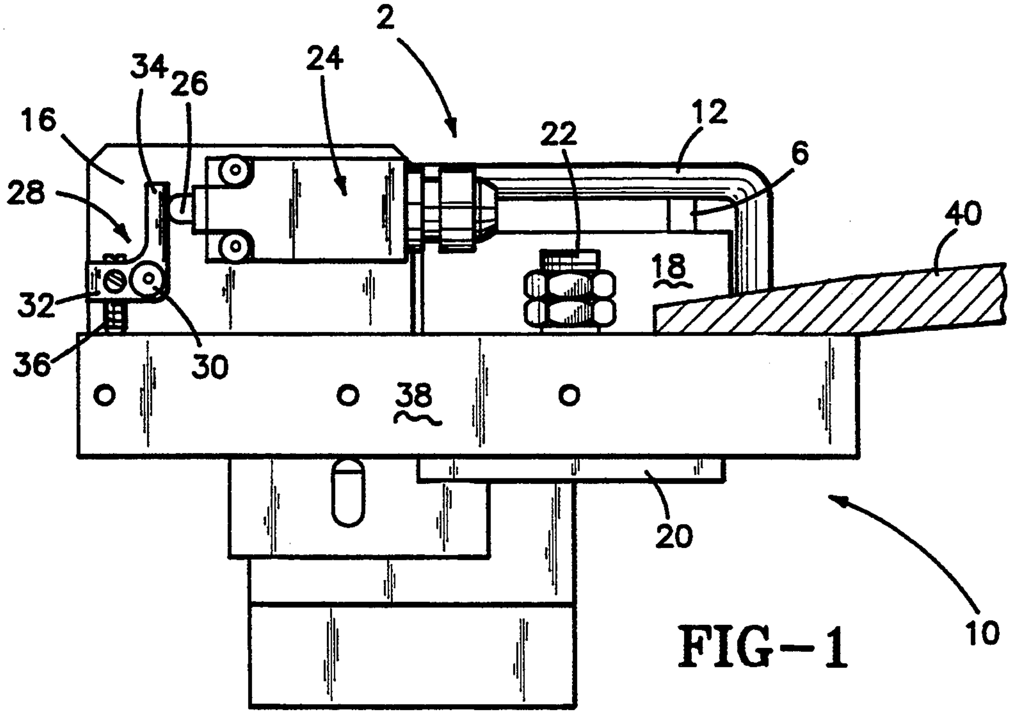
FIG. 1 is an elevational view, partially in section, of an escalator stop switch assembly which can be calibrated by the tool of this invention.

Referring now to FIG. 1, the exit landing area of an escalator or moving walkway is shown and is denoted generally by the numeral 2. The escalator truss has a U-shaped member 6 secured thereto. The member 6 extends from the truss toward the area 10 on the escalator through which the escalator steps (not shown) travel. A U-clamp 12 connects a bracket to the member 6, the bracket including a first upwardly turned switch assembly support flange 16 and a second downwardly depending L-shaped combplate support 18. The combplate support 18 has a lower horizontal platform 20 which carries a vertical threaded stud 22 welded thereto.

The flange 16 has mounted thereon an electrical switch assembly 24 which is a component of the electrical circuit for the escalator or walkway power source. The switch 24 is preferably a "normally closed" switch which includes spring-biased button 26 which, when pressed, opens the switch 24. When the switch 24 is closed, the escalator or walkway is powered, or "on" and when the switch 24 is opened, the escalator or walkway is shut off. Obviously, the opposite mode of operation of the switch 24 would provide an equivalent control for the operation of the safety assembly. A switch control rocker 28 is mounted on the flange 16 for pivotal movement about a pin 30. The rocker 28 has a horizontal arm 32 and a vertical arm 34. The horizontal arm 32 has a finely threaded adjustment screw combplate sensor 36 therein which contacts an angle iron 38 that is welded to one side edge of the combplate 40 outboard of the path of travel 10 of the steps. The adjustment screw 36 is properly set so as to position the rocker vertical arm 34 against the switch button 26, whereby appropriate upward movement of the combplate 40 and angle iron 38 will cause the rocker arm 34 to depress the switch button 26 and actuate the switch 24 to interrupt power to the escalator. The switch-actuating upward movement of the combplate 40 will result from wedging of objects between combplate 40 and the steps. The switch 24 is preferably a micro plunger make/break switch which is a component of a conventional safety circuit that can interrupt power to the conveyor. Preferably, the switch will be one that must be manually reset after it has been actuated.

Figure 2:
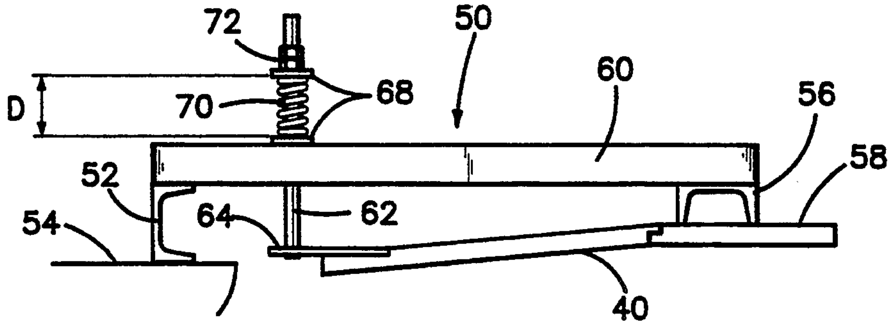
FIG. 2 is a fragmented side elevational view, partially in section, of the exit landing area of an escalator showing the tool of this invention in place for calibrating the stop switch assembly of FIG. 1.
Figure 3:
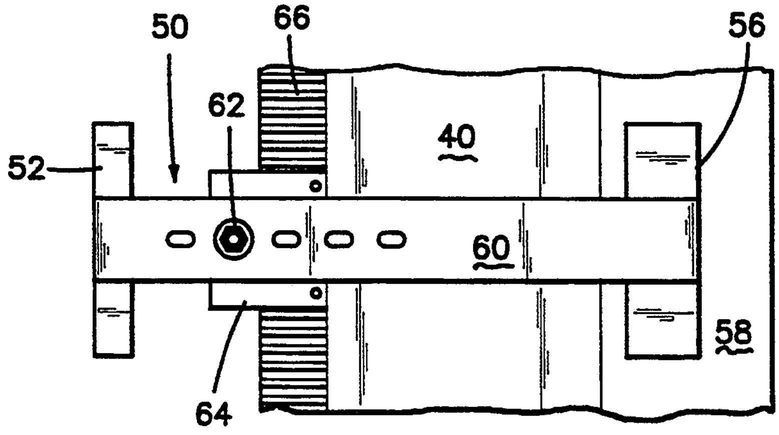
FIG. 3 is a plan view of the landing area shown in FIG. 2.
Figure 4:
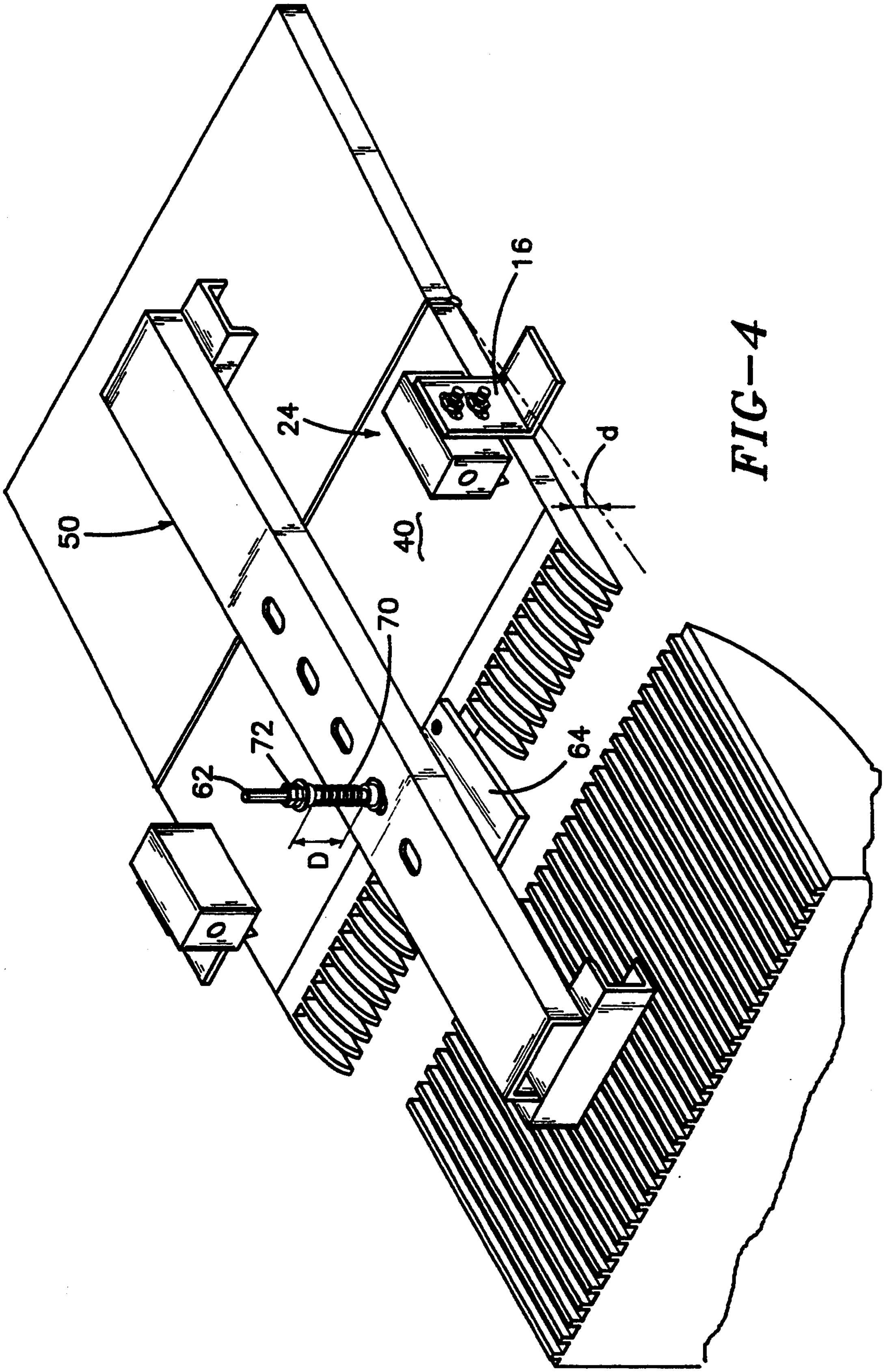
FIG. 4 is a fragmented perspective schematic view of the exit landing area.

The aforesaid stop switch assembly is described in greater detail in the copending application 07/914,823; and is calibrated by the tool shown in FIGS. 2–4.

Referring now to FIGS. 2–4, the calibrating tool of this invention is shown. The tool, denoted generally by the numeral 50 includes a first leg 52 which is positioned on a landing level step 54, and a second leg 56 positioned on the landing plate 58. A horizontal channel 60 interconnects the legs 52 and 56 and extends over the combplate 40. A threaded rod 62 extends through an opening in the channel, and has a mounting plate 64 secured to its lower end. One of the comb pieces 66 will be removed from the combplate 40 so that the mounting plate 64 can be attached to the combplate 40, via conventional fasteners, as shown in FIGS. 2 and 3. The rod 62 has a pair of spring seat washers 68 mounted thereon, with a coil spring 70 sandwiched therebetween. A pair of adjustment nuts 72 are mounted on the rod 62 above the uppermost spring seat washer 68. When the mounting plate 64 is secured to the combplate 40, the nuts 72 will be positioned on the rod 62 so as to compress the spring 70 between the washers 68 to a predetermined distance "D", as shown in FIG. 2. This distance D is calibrated using the constant of the spring 70 to identify when the lifting force exerted by the spring 70 on the combplate 40 equals X lb. ("X lb", being the deflection force required by code to cause the combplate to shut the escalator off).

Referring to FIG. 4, when the spring 70 has been compressed to precalibrated length D, the combplate 40 will be lifted a distance d above its normal rest position. The distance d will vary from combplate to combplate, but it is generally about one-sixteenth of an inch (1.6 mm). With the combplate 40 elevated above its rest position, the stop switch 24 is adjusted on the bracket 16 so as to just actuate at the combplate elevation d. A voltmeter can be used to test the switch 24, and then the switch 24 is tightened in place on the bracket 16.

After the switch 24 is properly positioned, the mounting plate 64 is disconnected from the combplate 40 and the comb section reattached. The escalator or walkway is then ready to be operated.

It will be readily appreciated that the tool and method of this invention can properly calibrate any pivoting combplate safety stop switch assembly regardless of the weight or ease of pivoting of the combplate, so long as the code requirements are known. The tool is very simple in construction, easy to use, and very reliable. Its portable nature allows it to be easily carried from job site to job site. The tool can also be used to check the accuracy of precalibrated combplates during normal servicing of escalators and moving walkways.

Since many changes and variations of the disclosed embodiment of the invention may be made without departing from the inventive concept, it is not intended to limit the invention otherwise than are required by the appended claims.

What is claimed is:

1. A method for setting an escalator safety switch assembly at a power-interruption position defined by a known upward force imparted to a vertically deflectable exit combplate on the escalator, said method comprising the steps of:

a) applying said known upward lifting force to said combplate to elevate said combplate above its normal rest position;

b) positioning said safety switch assembly to engage the elevated combplate end so as to set the switch in a power-interrupted state; and c) returning said combplate to its normal rest position so as to disengage said switch from said combplate.

2. The method of claim 1 wherein said applying step includes the steps of: providing a coil spring assembly; compressing said spring assembly to a first length and connecting said spring assembly to said combplate; expanding the length of said compressed spring assembly until said known upward lifting force is imposed on said combplate by said spring assembly.

3. The method of claim 2 wherein said spring assembly is expanded to a predetermined length which is determinative of said known upward lifting force.

4. A method for setting an escalator safety switch assembly in a power-interrupted state defined by a predetermined upward lifting force imparted to a vertically deflectable exit combplate on the escalator, said method comprising the steps of:

a) temporarily connecting a lifting assembly to said combplate;

b) applying said known upward force to said combplate with said lifting assembly to elevate said combplate above its normal rest position;

c) positioning said safety switch assembly so as to engage the elevated combplate, and so as to set the switch in the power-interrupted state;

d) releasing said upward lifting force so as to return said combplate to its normal rest position while disengaging said switch from said combplate; and e) disconnecting said lifting assembly from said combplate.

5. An assembly for setting an escalator power-interruption safety switch on an escalator, which safety switch is actuated by a predetermined amount of upward movement of a combplate at an escalator exit landing, said assembly comprising:

a) a bridge member having opposed ends which rest on stationary parts of the escalator on either side of the combplate, and a medial span extending between said opposed ends, said span being elevated above the combplate;

b) a bracket adapted to be secured to a comb end of the combplate;

c) a rod secured to said bracket and extending from the latter through said bridge span, said rod and said bracket being vertically movable relative to said bridge span;

d) a coil spring assembly mounted on said rod and seated on an upper surface of said bridge span, said spring assembly being operable to exert a lifting force on the combplate when said bracket is attached to the combplate; and e) means for varying the degree of compression of said spring assembly, whereby a predetermined length of said compressed spring assembly can be obtained which indicates a known and required upward lifting force on the combplate, said lifting force being operable to raise the combplate to a position at which the safety switch can be set to interrupt power to the escalator.

6. The assembly of claim 5 wherein said rod is externally threaded and said means for varying comprises a nut and spring seat threaded onto said rod in contact with an end of said spring assembly distal of said bridge span.

* * * * *